INVENTORS
HENRY Y. KUHL
PAUL R. KUHL
Albert Sperry
ATTORNEY

INVENTORS
HENRY Y. KUHL
PAUL R. KUHL
Albert Sperry
ATTORNEY

United States Patent Office 3,302,767
Patented Feb. 7, 1967

3,302,767
EGG HANDLING EQUIPMENT
Henry Y. Kuhl and Paul R. Kuhl, both of Copper Hill-Reaville Road, Flemington, N.J. 08822
Filed May 6, 1965, Ser. No. 453,589
4 Claims. (Cl. 198—25)

This invention relates to egg handling equipment and is directed particularly to constructions whereby eggs can be moved in a controlled manner and in spaced relation from one location or elevation to another.

Modern egg handling equipment is designed to handle a large volume of eggs and to cause the eggs to move rapidly from one point to another or from one type of equipment to another without breakage. Thus, it is common practice to pass thousands of eggs an hour from egg arranging means or conveyors to egg candlers, cleaners, graders and packing equipment in a substantially continuous operation. For this purpose, the eggs must be moved very rapidly and, at the same time, handled in such a manner to prevent cracking, checking or other damage thereto.

In a typical installation of the egg handling means of the present invention, eggs being graded by weight are passed over scale pans of egg graders located at different elevations. Those eggs discharged from the grader at a higher elevation generally must be lowered onto a platform or conveyor in a controlled, rapid but gentle manner, whereas eggs from the grader positioned at a lower elevation may be discharged by gravity to the same or another platform or conveyor. In other installations, it is necessary to move eggs from a washer or the like to a spool type conveyor with the axis thereof oriented to parallel positions and as rapidly as possible to prevent blocking or interference in the operation of the washer or other equipment by previously handled or accumulations of eggs.

In accordance with the present invention, the egg handling means embodies a pair of parallel rotatable discs with a plurality of elastic and resilient bands extending parallel to the axis of rotation of the discs and located adjacent the periphery of the discs with the bands spaced apart distances which are substantially less than the diameter of the eggs to be moved. The discs and elastic bands thus cooperate to form a drum which is spaced from the surface over which the eggs are to be moved a distance less than the diameter of the eggs. In this way, the eggs may be yieldably held in contact with the surface by a plurality of the elastic bands while at the same time, the bands serve to hold the eggs in such spaced relation as to prevent the presence and movement of one egg by the equipment from interfering with the reception, movement and release of another egg thereby. The elastic bands being parallel to each other also tend to orient the eggs engaged thereby into positions wherein the long axes of the eggs are parallel to each other.

It is, therefore, an object of the present invention to provide novel egg handling means which are operable at high speed to move eggs over a surface in a controlled manner and in spaced relation and from one elevation or location to another while preventing the eggs from interfering with each other or being damaged during the handling thereof.

A particular object of the invention is to provide egg moving means in the form of a drum rotatable about an axis and having a plurality of yieldable elastic bands located adjacent the periphery of the drum and spaced apart a distance substantially less than the diameter of the eggs so as to cause a plurality of such bands to engage each egg simultaneously as it is moved over a surface adjacent the drum.

These and other objects and features of the present invention will appear from the following description thereof wherein reference is made to the figures of the accompanying drawings.

Figure 1:
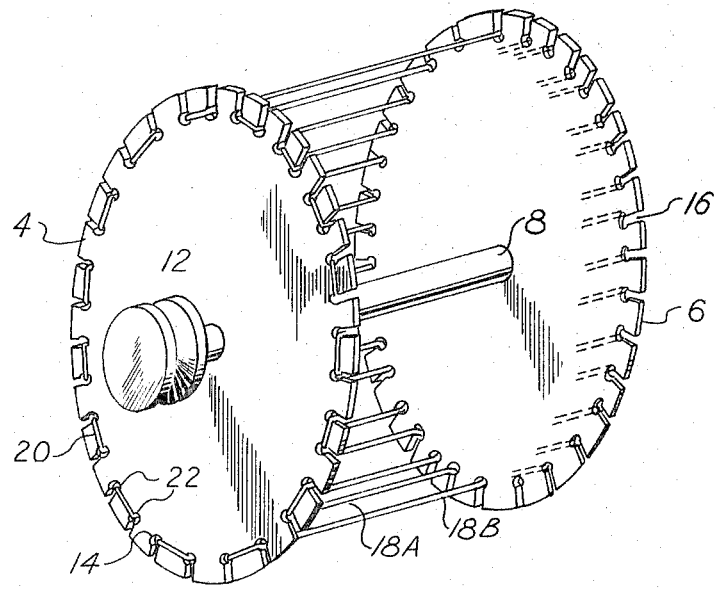
FIG. 1 is a perspective illustrating a typical egg moving drum embodying the present invention.

In that form of the invention chosen for purposes of illustration in the drawings, the egg moving means is in the form of a drum 2 embodying two spaced and parallel discs 4 and 6 secured to a shaft 8 by means of nuts 10 or otherwise to permit the drum to be rotated by a pulley 12 or other means connected to the shaft 8.

The discs 4 and 6 are spaced apart a distance substantially greater than the length of the eggs to be moved; say 3 to 6 inches apart, and the discs are generally about 6 to 12 inches in diameter and preferably about 8½ inches in diameter.

Each of the discs of the drum is provided with a plurality of openings 14 located adjacent the periphery thereof and a narrow radial slot 16 extends from the opening to the edge of the disc for insertion of an elastic and resilient band 18 into the opening. The openings 14 in the discs 4 and 6 are preferably aligned axially and parallel to the shaft 8 and are spaced a uniform distance from the shaft 8 and the axis of rotation of the drum. While the openings 14 are preferably spaced substantially uniform distances apart circumferentially of the discs, they must in any event be spaced apart distances which are substantially less than the diameter of the eggs to be moved or handled by the drum. Thus while most eggs are about 1½ to 2 or 2½ inches in diameter, the openings 14 are spaced apart circumferentially a distance of about ⅜ to ⅞ of an inch, and preferably are about ⅝ inch apart.

In a typical construction, the openings 14 are circular in cross section and about 3/16 inch in diameter whereas the slot 16 need only be about 1/16 inch in width. The resilient and elastic bands 18 may be formed of any suitable or preferred material such as rubber or coiled spring wire and may have a width or diameter not exceeding the diameter or width of the openings 14. The bands are preferably held under tension so that they will be yieldable but continually tend to return to positions parallel to the axis of rotation of the drum after deflection thereof by an egg. As a result, the drum is so constructed as to present a substantially cylindrical egg engaging surface made up of a large number of springy and yieldable bands or strands of resilient material. While the bands 18 are spaced apart approximately equal distances, it is common practice to employ conventional continuous elastic bands made of rubber and to slip bands through the slots 16 into adjacent openings 14 aligned axially in the discs 4 and 6 so that the ends of the bands pass across the space between the openings on the outer sides of the discs as shown at 20. The bands, being under tension, then are drawn toward the adjacent sides of the adjacent openings 14, as shown at 22 in FIGS. 1 and 2, whereby the pair of individual strands 18A and 18B of any single elastic band may be located somewhat closer to each other than they are to the strands of those elastic bands located in the pairs of openings on opposite sides thereof.

It is, of course, possible to use any other suitable or preferred type of elastic and resilient material in forming the bands 18 and they may be secured to the discs of the drum in any desired manner. Nevertheless, it is highly desirable to locate the bands in parallel relation and near the periphery of the discs and they preferably are located substantially equal distances from the axis of rotation of the drum. Furthermore, the drum must be so arranged with respect to the surface 26 over which the eggs are to be moved that the cylindrical surface of the drum composed of the elastic bands will be spaced from the surface 26 a distance substantially less than the diameter of the eggs to be handled and preferably a distance not exceeding about one half the diameter of the eggs—say about one inch or so. The surface 26 may be flat, curved or inclined and either stationary or movable as required for any particular application of the invention. In any event, the egg supporting surface 26 should have a portion converging toward the drum to cooperate with the drum in forming an egg receiving inlet as indicated at 28 in FIG. 3. In a similar way, the surface 26 should have a portion which diverges from the cylindrical surface of the drum to provide an egg discharging outlet 30, and the drum should be rotated in a direction as indicated by the arrow 32 to move the eggs from the inlet 28 to the outlet 30 in a controlled manner and in spaced, non-interfering relation with one another.

Figure 2:
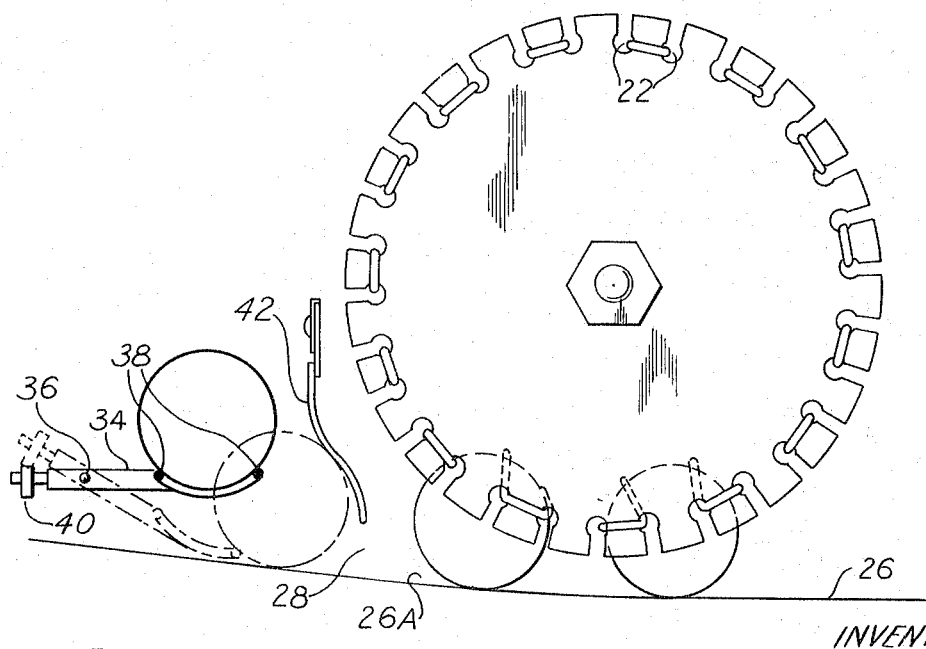
FIG. 2 is a vertical sectional view through one form of equipment embodying the present invention.

As shown diagrammatically in FIG. 2, the invention may be used in combination with egg grading equipment including a balance beam 34 tiltable about a pivot 36 and having a scale pan in the form of rails 38 over which the eggs to be graded by weight are movable. A counterweight 40 is carried by the balance beam 34 and adjusted to cause the beam to tilt to the dotted line position of FIG. 2 to discharge an egg of predetermined weight from the rails 38 to an inclined surface 26A, while allowing eggs of insufficient weight to move on over the rails 38 to a further weighing device in the grader. If desired, the grader may be provided with a cover or housing 42 with an opening adjacent the weighing device provided with yieldable fingers or curtain means 44 to prevent bouncing of the egg as it is discharged from the balance beam. The drum 2 of the present invention is located close to the balance beam or curtain means 44 and above the surface 26A to receive and remove the eggs graded by the weighing device as rapidly as they are discharged therefrom. In this way, it is possible to prevent a previously weighed and discharged egg from interfering with the operation of the weighing device in discharging another egg therefrom whereby the weighing device may be actuated as rapidly as required or capable to assure accurate grading of the eggs.

Figure 3:
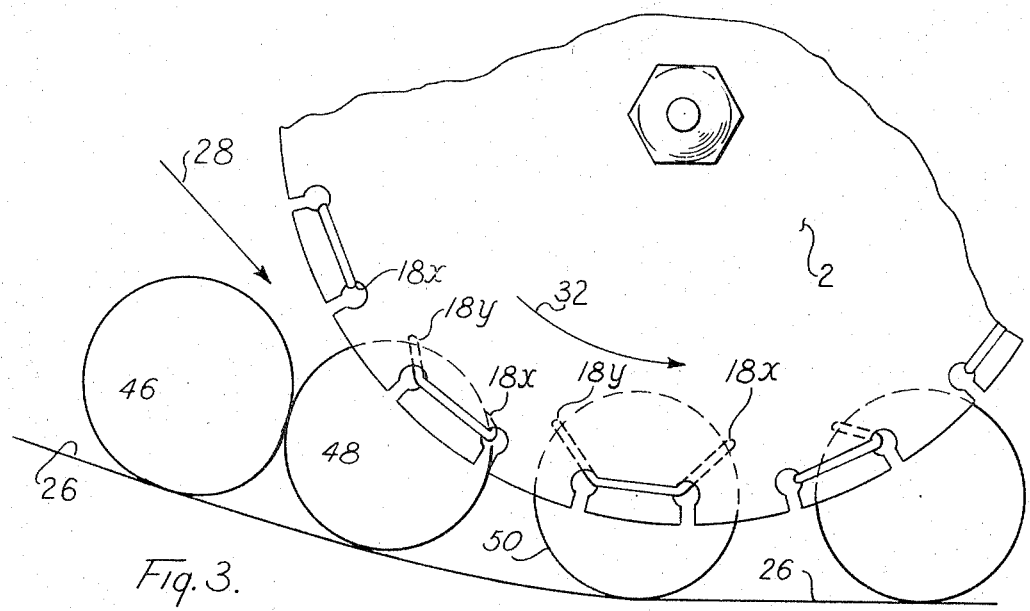
FIG. 3 is an enlarged vertical sectional view of the drum shown in FIGS. 1 and 2 illustrating the manner in which eggs are engaged thereby.
Figure 4:
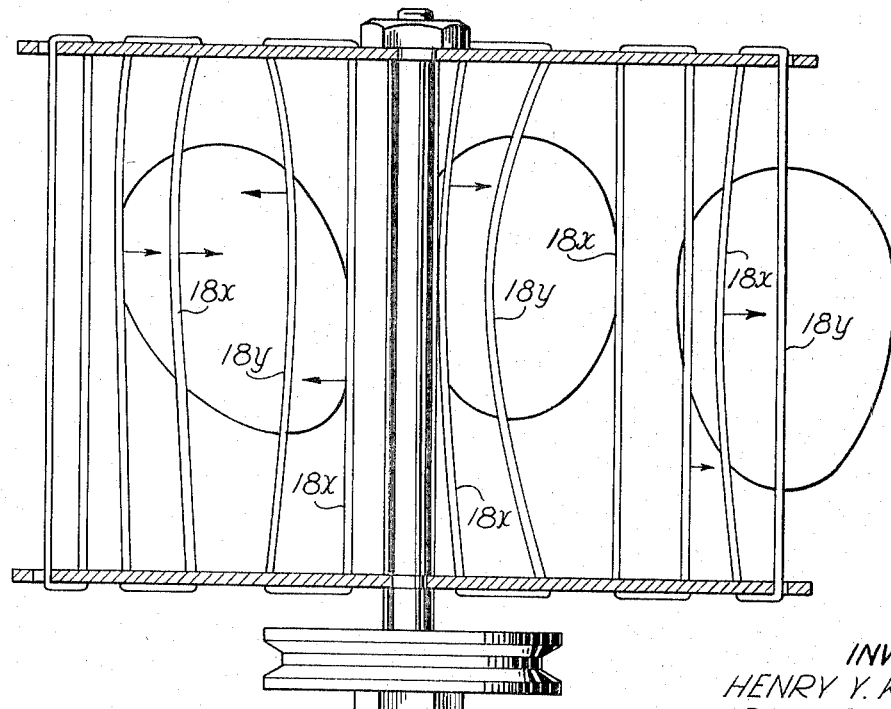
FIG. 4 is an enlarged plan view of a portion of the drum of FIGS. 1, 2 and 3.

With the construction of the present invention, whether used with an egg grader or elsewhere, the eggs can be moved from one position to another rapidly and in a controlled manner while cushioning the action thereon and preventing the eggs from contacting or interfering with one another as they are moved. Thus as shown in FIGS. 3 and 4, an egg 46 moving over the surface 26 toward the rotating drum 2 enters the converging egg receiving inlet 28 so as to be engaged by an initial flexible and resilient band $18^x$. As the egg moves on to the position of the egg 48 of FIG. 3, it also is engaged by at least one additional band $18^y$. The egg 48 then is not only urged toward the surface 26 by a plurality of deflected elastic bands but is also held against undesired or free movement onward over the surface 26 to a position wherein it could engage a preceding egg 50. The flexible bands engaging the eggs 48 and 50 being parallel tend to turn the eggs into positions in which their long axes are parallel as shown in FIG. 4. Furthermore, since the bands are spaced apart a distance less than the diameter of the eggs, the bands on the drum will move downward into the space between the curved surfaces of adjacent eggs entering the converging egg receiving inlet 28 of the assembly. As a result, even when the eggs are close together or even in actual contact as they approach the drum, each egg thereafter will be engaged by a plurality of the elastic bands. Since the bands $18^x$ and $18^y$ are flexed by the egg they engage, they serve to space adjacent eggs from each other. The action of the tensioned bands $18^x$ and $18^y$ which are adjacent tend to urge the eggs apart as represented by the small arrows adjacent the bands $18^x$ and $18^y$ as the bands tend to move away from each other to their normal undeflected positions parallel to each other. Accordingly, adjacent eggs are always held in spaced relation by oppositely deflected bands as they move over the egg supporting surface 26.

In this way, each egg in turn is moved independently over the surface 26 by the drum and while being yieldably urged toward the surface and at the same time spaced from adjacent preceding and following eggs being moved over the surface. Since resilient action of the parallel bands 18 also tends to orient the eggs to turn them into positions wherein the long axes of the eggs extend parallel to the axis of rotation of the drum, the eggs are discharged to the diverging egg discharging outlet 30 with their axes parallel to the bands 18. The eggs then may roll freely on to other locations or equipment or be transferred in oriented positions to spool type conveyors or be otherwise moved from one location to another for further handling as desired.

Figure 5:
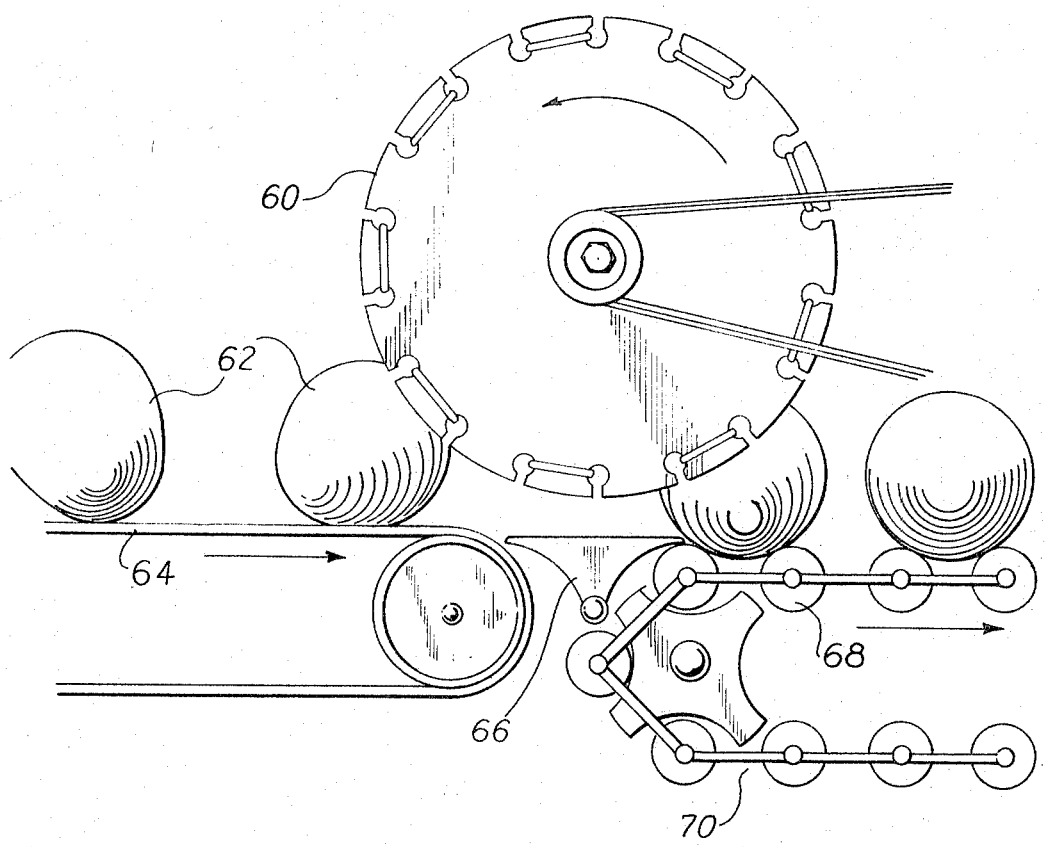
FIG. 5 is a vertical sectional view through an alternative form of equipment embodying the present invention.

As shown in FIG. 5, the drum 60 may be used to move eggs 62 from a conveyor 64 of an egg washer or the like over a filler piece 66 to the spools 68 of a spool type conveyor 70 employed in an egg candler or the like such as the egg candler shown in U.S. Patent No. 1,884,034, for example. The elastic bands of the drum 60 then not only serve to space the eggs properly to insure proper placement thereof in the cavities of the spools 68 of the conveyor 70, but also serve to orient the eggs in such a way as to insure the desired arrangement thereof with their axes parallel to the axes of the spools 68.

While the constructions shown and described are particularly adapted for use in combination with egg graders, washers, candlers and the like, they have many other applications and uses in the controlled handling and movement of eggs. It will also be apparent that the flexible bands employed may be variously formed and arranged to engage and move eggs as described whereas the surface on which the eggs are supported may be horizontal, inclined or otherwise arranged and the egg supporting surface may itself be a conveyor or belt or be otherwise movable relative to the drum, if desired.

In view thereof, it should be understood that the particular embodiments of the invention shown and described are intended to be illustrative only and are not intended to limit the scope of the invention.

We claim:

1. Means for moving eggs in a controlled manner over an egg supporting surface comprising a drum embodying parallel discs of substantially equal diameter spaced apart a distance substantially exceeding the length of the eggs to be moved and arranged with the peripheries of the discs spaced from said egg supporting surface a distance substantially less than the diameter of the eggs to be moved, means carried by said discs for holding eggs in engagement with said surface during movement of the eggs over said surface including a plurality of flexible and elastic bands extending from one of said discs to the other adjacent the peripheries of the discs, said bands being parallel to each other and spaced substantially equal distances from the axes of said discs, said bands further being spaced apart a distance substantially less than the diameter of the eggs to be moved so that a plurality of said bands will engage each egg and urge the same toward said surface whereby adjacent eggs will be spaced from each other by oppositely deflected bands urging the eggs apart during the movement thereof over said surface.

2. Means for moving eggs as defined in claim 1 wherein said drum is secured to a shaft extending axially of said discs and means are provided for rotating said shaft and drum.

3. Means as defined in claim 1 wherein the egg supporting surface and the drum cooperate to define a converging egg receiving inlet and a diverging egg discharging outlet, and said drum is rotated relative to the egg supporting surface to move eggs over said surface from said inlet to said outlet.

4. Means as defined in claim 1 wherein said discs are provided with axially aligned openings near the peripheries thereof and have slots extending from said openings to the periphery of the disc, and said bands are continuous elastic bands passed through the slots into adjacent openings in the disc to the other and extend between adjacent openings in the discs on the outer faces of the discs.

References Cited by the Examiner

UNITED STATES PATENTS

| 1,922,717 | 8/1933 | Smitt | 198—25 |
| 3,227,298 | 1/1966 | Shoemaker | 214—356 |

FOREIGN PATENTS

| 1,388 | 1902 | Great Britain. |

EVON C. BLUNK, *Primary Examiner.*

EDWARD A. SROKA, *Examiner.*